United States Patent [19]

McGinnis

[11] 4,316,442
[45] Feb. 23, 1982

[54] INLET MANIFOLD PREHEATING DEVICE

[76] Inventor: George P. McGinnis, 3426 Hammerberg, Flint, Mich. 48507

[21] Appl. No.: 96,047

[22] Filed: Nov. 20, 1979

[51] Int. Cl.³ .............................................. F02M 31/00
[52] U.S. Cl. .................................... 123/546; 261/144
[58] Field of Search ............... 123/546, 549; 261/144, 261/145; 165/51, 52

[56] References Cited

U.S. PATENT DOCUMENTS

| | | | |
|---|---|---|---|
| 1,631,176 | 6/1927 | Wirrer | 123/549 |
| 1,698,099 | 1/1929 | Kingston | 123/546 |
| 3,482,556 | 12/1969 | Ferriday | 123/546 |
| 3,530,844 | 1/1970 | Kawai | 261/145 |
| 3,760,780 | 9/1973 | Jordan | 123/549 |
| 3,930,477 | 1/1976 | Jordan | 123/549 |
| 4,133,327 | 1/1979 | Inoue | 261/144 |

Primary Examiner—Ronald H. Lazarus
Attorney, Agent, or Firm—Hauke and Patalidis

[57] ABSTRACT

A preheating device for the inlet manifold of an internal combustion engine, comprising at least one probe projecting into the exhaust manifold of the engine connected via a heat-conductive metallic rod or pipe to a second probe projecting into the inlet manifold, for transferring heat from the exhaust manifold to the fuel-air charge flowing through the inlet manifold. The probe disposed in the inlet manifold may be provided with an electrical heating element such as to preheat the interior of the inlet manifold prior to starting the engine, and providing heat to the fuel-air charge during cold starts of the engine.

8 Claims, 10 Drawing Figures

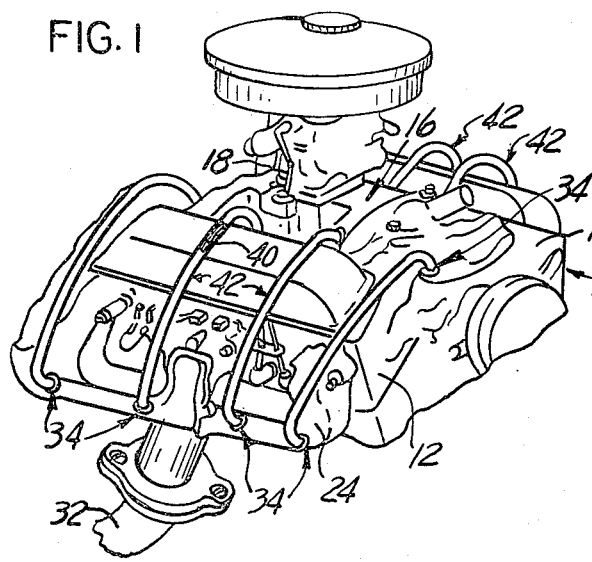
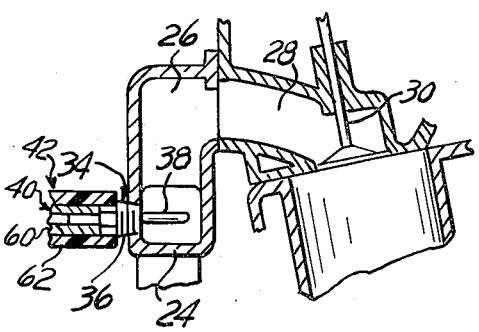
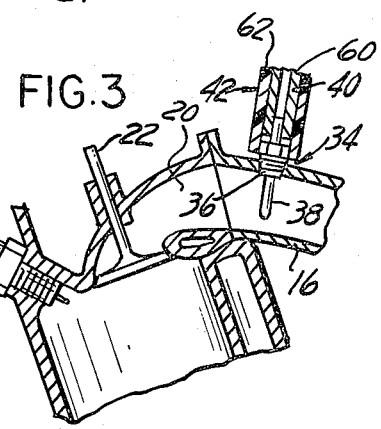
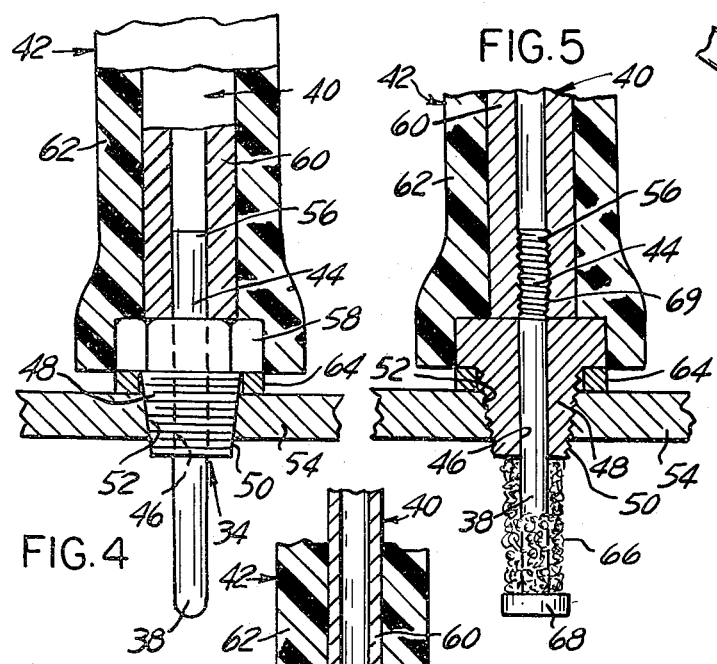
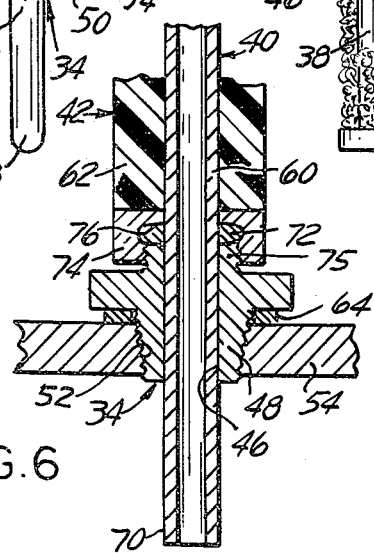
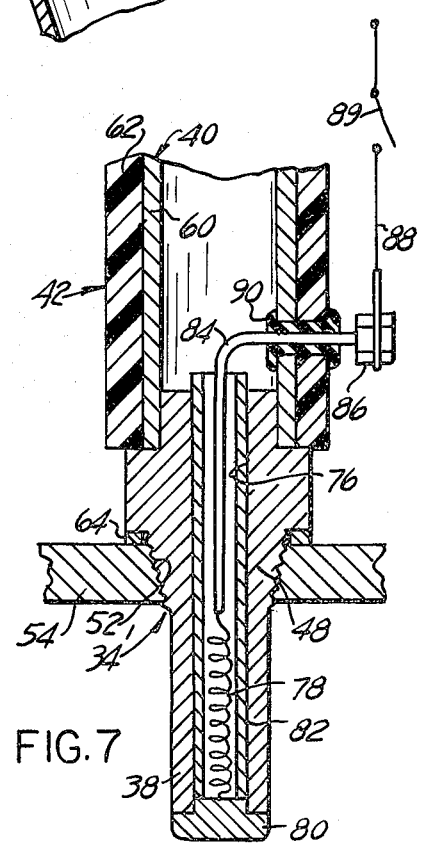

INLET MANIFOLD PREHEATING DEVICE

BACKGROUND OF THE INVENTION

In certain types of internal combustion engines, for example in internal combustion engines wherein the cylinders are disposed in line, it is a common practice to utilize a single casting for the inlet and exhaust manifolds or, alternatively where separate castings are used for the inlet and exhaust manifolds, to dispose the manifolds in close proximity with each other such that heat from the exhaust manifold is convectively transferred through the engine cylinder block to the walls of the inlet manifold, thus warming the air-fuel mixture flowing through the inlet manifold and aiding in vaporizing the droplets of fuel entrained by the air flow through the carburetor throat.

In internal combustion engines of the V-type, such as V-8 or V-6 engines, the inlet manifold is generally bolted on the top of the cylinder block between the two inclined banks of cylinders, and a pair of exhaust manifolds are used, each exhaust manifold being bolted over the exhaust ports on the side of each bank of cylinders. Due to the distance separating the exhaust manifolds from the inlet manifold, heat transfer from the exhaust manifolds to the inlet manifold is not readily effected by convection through the mass of the cylinder block and separate heads, with the result that the engine is subjected to long warming up periods, especially in winter, during which fuel remains suspended in the flow of induction air in the form of relatively large droplets and tends to condense on the cold walls of the inlet manifold, resulting in imperfect combustion within the combustion chambers caused by excessive choking of the carburetor inlet to provide an over-rich mixture, with the accompanying symptoms of loss of power, poor acceleration, incomplete combustion and raw fuel being present in the exhaust gases.

SUMMARY OF THE INVENTION

The present invention remedies the inconveniences enumerated above by providing a heat transfer conduit between a probe projecting within the exhaust manifold of an internal combustion engine, which is heated by the exhaust gases as soon as the engine is started, and a similar probe disposed in the inlet manifold, with the result that the charge of air-fuel mixture passing through the inlet manifold is rapidly heated, even though the walls of the inlet manifold may remain relatively cool, thus improving atomization of the fuel and improving combustion in a short time after the engine has been started.

The invention further contemplates that the probe disposed projecting within the inlet manifold may be electrically preheated prior to starting the engine and, if so desired, continuously electrically heated during normal operation of the engine.

Diverse objects and advantages of the present invention will become apparent to those skilled in the art when the following description of the best mode contemplated for practicing the invention is read in conjunction with the accompanying drawing wherein like numerals refer to like and equivalent parts, and in which:

BRIEF DESCRIPTION OF THE DRAWING

FIG. 1 is a perspective partial view of a typical internal combustion engine of the V-type, provided with the inlet manifold preheating device of the present invention;

FIG. 2 is a schematic transverse sectional view through the exhaust manifold of the internal combustion engine of FIG. 1 showing an example of heat pickup probe according to the present invention mounted projecting within the exhaust manifold;

FIG. 3 is a partial schematic transverse sectional view through the inlet manifold of the internal combustion engine of FIG. 1 showing an example of heat providing probe according to the present invention mounted projecting within the inlet manifold;

FIG. 4 is a partial section through the probe of FIGS. 2 and 3, shown at an enlarged scale;

FIG. 5 is a view similar to FIG. 4 but showing a modification thereof;

FIG. 6 is a view similar to FIG. 4 but showing a further modification thereof particularly useful as a heat pickup probe according to the present invention FIG. 7 is a view similar to FIG. 4 but showing a modification thereof for an electrically heated inlet manifold probe;

DETAILED DESCRIPTION OF THE PREFERRED EMBODIMENTS

Figure 8:
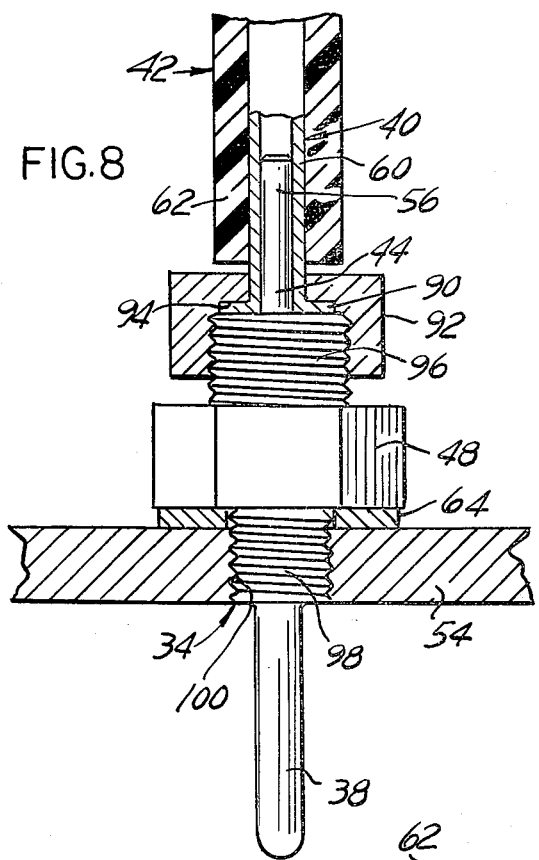
FIGS. 8 and 9 are views similar to FIG. 4 but showing other modifications thereof.

Referring to the drawing, and more particularly to FIG. 1, there is schematically illustrated in perspective view the cylinder head portion of a typical internal combustion engine 10 of the V-type, such as a V-8 engine, provided with two cylinder blocks 12 and disposed at an angle relative to each other. Within the V formed by the cylinder blocks, an inlet manifold 16 is bolted to the top of the engine block, the inlet manifold 16 being provided on its interior with, in the example illustrated, two branches of four conduits each feeding the air-fuel mixture obtained from a carburetor 18 to the inlet valve passageway or port 20 of one of eight inlet valves 22, FIG. 3, four cylinders, and consequently four inlet valves being disposed in each of the two banks of cylinders. An exhaust manifold 24 is bolted on the outer side of each cylinder block 12, each exhaust manifold 24, in the example of structure illustrated, having four branch outlet conduits 26 for collecting exhaust gases from the exhaust passageway or port 28 of each one of four exhaust valves 30, FIG. 2, the branch conduits 26 of each manifold 24 leading into a common exhaust conduit or pipe 32.

The invention provides a probe 34 mounted through a threaded aperture 36, FIG. 2, through the wall of the outlet manifold 24 and having a projecting portion 38 disposed within the manifold. A single probe 34 may be used or, as illustrated, as many probes as there are cylinders in each cylinder bank, it being understood however, that only convenience and ease of installation limit the number of probes thus disposed in the exhaust manifold 24. Each probe 34 is connected to a similar probe 34 disposed through a threaded aperture 36 through the wall of the inlet manifold 16 by means of a heat transfer conduit 40, preferably covered by heat insulating material 42.

As shown in detail at FIG. 4, the probes 34 are conveniently made of a rod 44 of heat conductive metal or metal alloy such as copper, bronze or the like press-fitted in a bore 46 longitudinally disposed through a plug member 48 having a tapered threaded peripheral surface 50 engageable with a threaded tapered circular aperture 52 formed through the wall 54 of the inlet or outlet manifold, such that an end portion 38 of the rod 44 projects within the manifold. The other end portion 56 of the rod 44 projects above the preferably hexagonal head 58 of the plug 48 and is fastened within the end of, for example, a metallic tube 60 forming the heat transfer conduit 40. The plug 48 may also be made of copper or bronze, or it may be made of any other convenient metal or alloy, such as steel or the like. The metallic tube 60 is made of copper or bronze, or any other metal or alloy good conductor of heat. The heat insulating material 42 is in the form of, for example, a coating or sleeve 62, made of material such as asbestos cloth and the like, disposed around the periphery of the metallic tube 60 to prevent heat losses. If so desired, an annular metallic gasket 64 may be disposed below the head 58 of the plug 48 to compensate for differences in coefficients of expansion between the material of the manifold wall 54 and the metal or alloys of which the probe 34 is made. Fastening means other than press-fitting may be used for assembling the probe rod 44 within the plug 48, such as forming the rod 44 with a peripheral thread and providing the bore 46 through the plug with an internal thread, a lock nut being used around the periphery of the projecting end portion 38 of the rod 44 for locking the rod in position. In addition, if so desired, the rod 44 may be brazed to the material of the plug 46 where it projects therefrom. Press-fitting, a screw thread or set screws may be used for fastening the end of the metallic tube 60 to the end portion 56 of the probe rod 44. Alternatively, a metallic rod, not shown, may be used instead of the tube 60, provided with appropriate connection means with the end 56 of the probe rod 44, such as brazing, an internally threaded bore on the end of the rod fastened over a peripheral thread on the probe end portion 56, or other connection means as described hereinafter.

It has been found that, although the probe rod 44 may be made solid, it is advantageous to use a porous material for either or both the inlet manifold probe and the outlet manifold probe and, as illustrated at FIG. 5, the projecting end portion 38 of the probe 34 may, in addition, be provided peripherally with a sleeve 66 made of copper wool or of stainless steel wool, or like material, a retainer ring 68 being fitted, such as by screwing, on the end of the projecting portion 38 of the probe rod 44.

Instead of being made of separate elements, the probe 34, especially the probe used projecting within the exhaust manifold, may consist simply of the end of the metallic tube 60, as illustrated at FIG. 6. The end of the tube 60 is passed through the longitudinal bore 46 of the plug 48, such that the end portion 70 of the metallic tube 60 project within the manifold and the pipe is clamped in position by means of, for example, a connector comprising a collapsible annular collet 72 clamping the periphery of the metallic tube 60 under the action of a nut 74 provided with an internal tapered shoulder abutment 76, of the type readily available on the market for connecting a pipe of large diameter to a pipe of small diameter in the plumbing trade. The plug 48 has a reduced diameter peripherally threaded portion 75 for threading thereover of the nut 74.

An advantage of the structure of FIG. 6 is that hot exhaust gases are enabled to circulate through the metallic tube 60, thus decreasing the time required for heating the metallic tube and conveying heat to the inlet manifold probe mounted on the end of the tube.

It will be appreciated by those skilled in the art that the structure of the probe 34, as shown in detail at FIG. 4, can be made of a single piece rather than consisting of the separate rod 44 and plug 48 press-fitted within one another, or otherwise assembled. The probe 34' of FIG. 7 is also made of a single piece comprising a projecting probe portion 38 and an integral plug portion 48. However, the probe 34' is tubular, as being provided with an internal bore 76. An electrical heating element 78 is disposed within the bore 76 at the projecting portion 38 of the probe, one end of the electrical heating element 78 being electrically connected to ground return through a metallic closure cap 80 press-fitted or otherwise fastened at the open end of the bore 76. An electrically insulating sleeve 82 lines the wall of the internal bore 76 to prevent short circuiting the electrical heating element 78, and the other terminal of the electrical heating element is connected by means of an electrically conductive bent-over rod 84 to the "hot" or ungrounded terminal of the motor vehicle electrical system through a switch 89 by way of binding post 86 and electric wire 88. A heat conductive metallic tube 60 is affixed to the plug 48, and an insulating grommet 90 is disposed through the wall of the metallic tube 60 to afford passage for the bent-over end portion of the terminal rod 84 of the electrical heating element 78.

The heating probe 34' is disposed through the wall of the inlet manifold and, by closing the switch 89, the projecting portion 38 of the probe is heated with the result that it is operative as soon as the engine is started, even before heat transfer is effected through the tube 60 from the probe disposed in the exhaust manifold.

Another means of connecting a heat transfer conduit 40, in the form of a metallic tube 60, to a probe 34 is illustrated at FIG. 8. The metallic tube 60 is provided with a flared flange 90 at its end, and a nut 92 having an internal annular shoulder 94 engageable with the metallic tube end flange 90, and an internal thread fitting over the peripheral thread of a reduced diameter portion 96 of the probe plug 48, is used to connect securely the metallic tube 60 to the plug 34. The probe plug 48 of FIG. 8, instead of having a conical threaded portion, has a straight threaded portion 98 for fitting into a corresponding straight threaded aperture 100 in the manifold wall 54.

Figure 9:
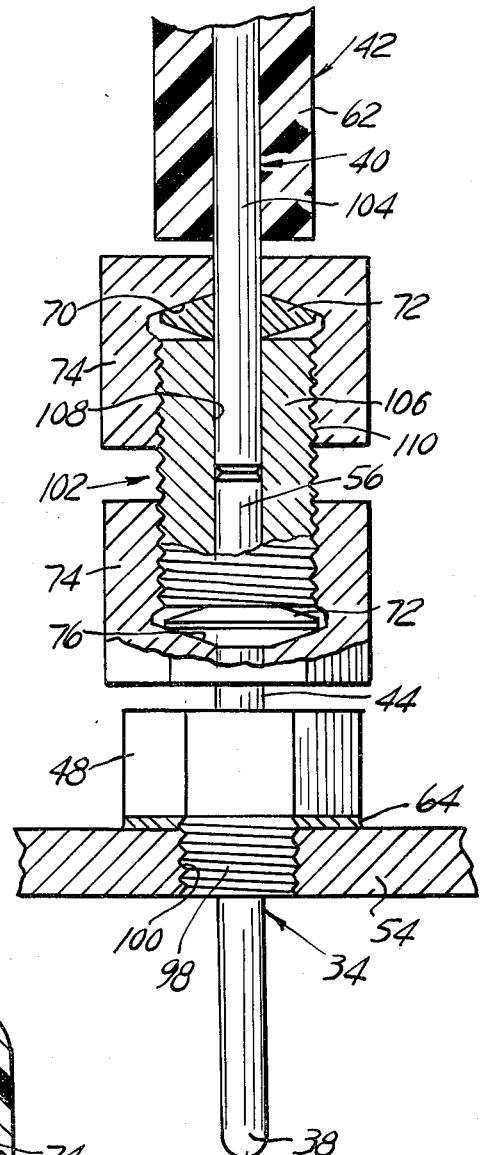

At FIG. 9 there is shown a connector structure 102 for connecting a probe 34 according to the invention to a heat transfer conduit 40 which may be a metallic tube, but which, in the example of structure illustrated, is a solid metallic rod 104. The connector 102 comprises a sleeve 106 having a longitudinal bore 108 accepting in one end the end of the heat transfer rod 104 and in its other end the end 56 of the probe rod 44. A pair of collapsible annular collets 72, one disposed around the periphery of the heat transfer rod 104 where it projects from the sleeve 106 and the other passed over the periphery of the projecting end 56 of the probe rod 44, securely clamp the end of the heat transfer rod 104 and the end of the probe rod 44 within the bore 108 of the sleeve 106, with the end faces of the rods abutting each other when the nuts 74 are tightened, the sleeve 106 being provided with a peripheral thread 110 engageable by the internal thread of the nuts 74.

Figure 10:
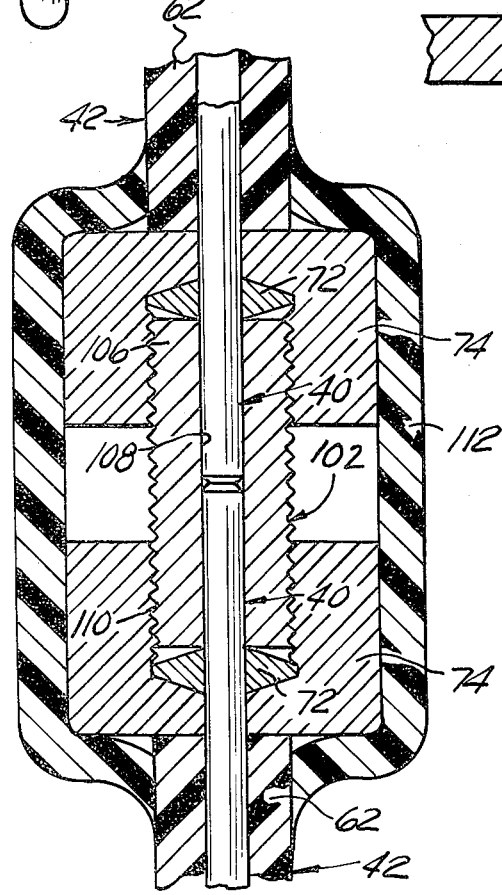
FIG. 10 is a partial section through an example of connector for coupling two lengths of heat transfer conduits between an inlet and an exhaust probe.

A similar connector 102 may be used, as shown at FIG. 10, for interconnecting two lengths of heat transfer conduit 40, which may be both a solid metallic rod or a metallic tube, or one of which may be a solid rod and the other a metallic tube. Such an arrangement is convenient for connecting two lengths of heat transfer conduit 40 when the heat transfer conduits are, at their other end, either made integral with a probe 34, press-fitted to the probe, connected with a thread arrangement as illustrated at FIG. 5, for example, or brazed to the probe. To limit heat losses, the connector 102 is covered, after the connection has been effected between the two lengths of heat transfer conduit 40, with several layers of heat insulating material, such as asbestos adhesive tape, or the like, such as to provide an insulating sleeve 112 integrally connected to the insulating sleeves 42 protecting each length of heat transfer conduit 40.

Having thus described the present invention by way of examples of structure designed to accomplish the objects of the invention, what is claimed as new is as follows:

1. An inlet manifold preheating device for internal combustion engine having an inlet manifold and an exhaust manifold, said device comprising at least a first heat conductive probe mounted in said inlet manifold and having a portion disposed projecting within said inlet manifold, a second heat conductive probe mounted in said exhaust manifold and having a portion disposed projecting within said exhaust manifold, and heat conductive means connecting said first probe to said second probe, wherein each of said probes is a single metallic elongated member having a threaded peripheral portion engaged with an internally threaded aperture through a wall of each of said manifolds and said heat conductive means is a metallic conduit having an end connected to one of said probes and another end connected to the other of said probes.

2. The device of claim 1 wherein said metallic conduit is a metallic tubular member.

3. The device of claim 2 further comprising a heat insulating sleeve disposed peripherally on said tubular member.

4. The device of claim 1 wherein said metallic conduit is a solid metallic rod.

5. The device of claim 4 further comprising a heat insulating sleeve disposed peripherally on said solid metallic rod.

6. The device of claim 1 wherein at least one of said probes comprises a plug forming said threaded peripheral portion engaged with said internally threaded aperture through the wall of said manifold, a longitudinal bore in said plug and a metallic rod mounted longitudinally through said bore in said plug, one end of said rod forming said portion of said probe projecting within said manifold and the other end of said rod being fastened to said heat conductive metallic conduit.

7. The device of claim 2, wherein said probe mounted in said exhaust manifold comprises a plug forming said threaded peripheral portion engaged with said internally threaded aperture through the wall of said exhaust manifold, a longitudinal aperture through said plug adapted to receive therethrough an end of said tubular member such that the end of the tubular member projects within said exhaust manifold, and means clamping said tubular member in said bore in said plug.

8. The device of claim 1 wherein said probe mounted in said inlet manifold comprises an elongated tubular member having said threaded peripheral portion engaged with said internally threaded aperture through the wall of said manifold, a tubular portion projecting within said manifold, a closure cap fitted on the end of said tubular projecting portion, and an electrical heating element having a terminal connected to said closure cap and another terminal connected through a switch to an ungrounded terminal of an electric power supply.

* * * * *